March 26, 1929.　　T. P. ARCHER ET AL　　1,706,598
HANDLE ASSEMBLY
Filed Jan. 11, 1926
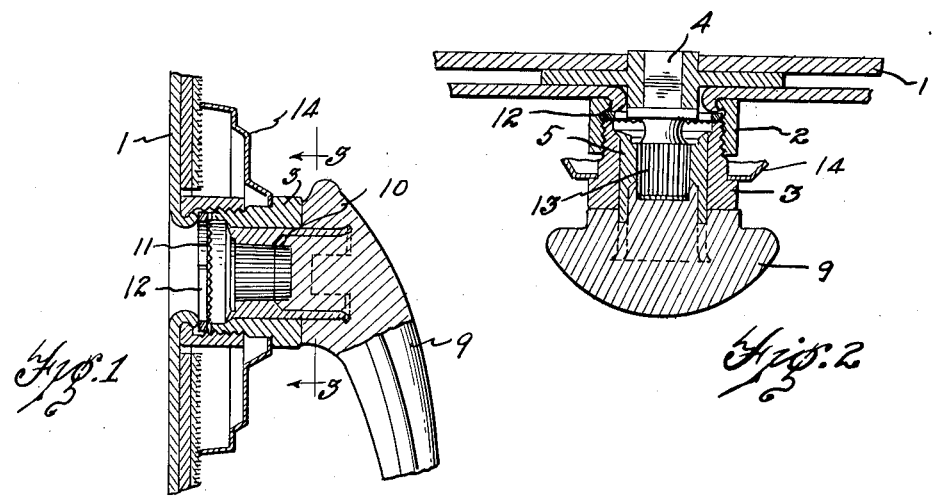
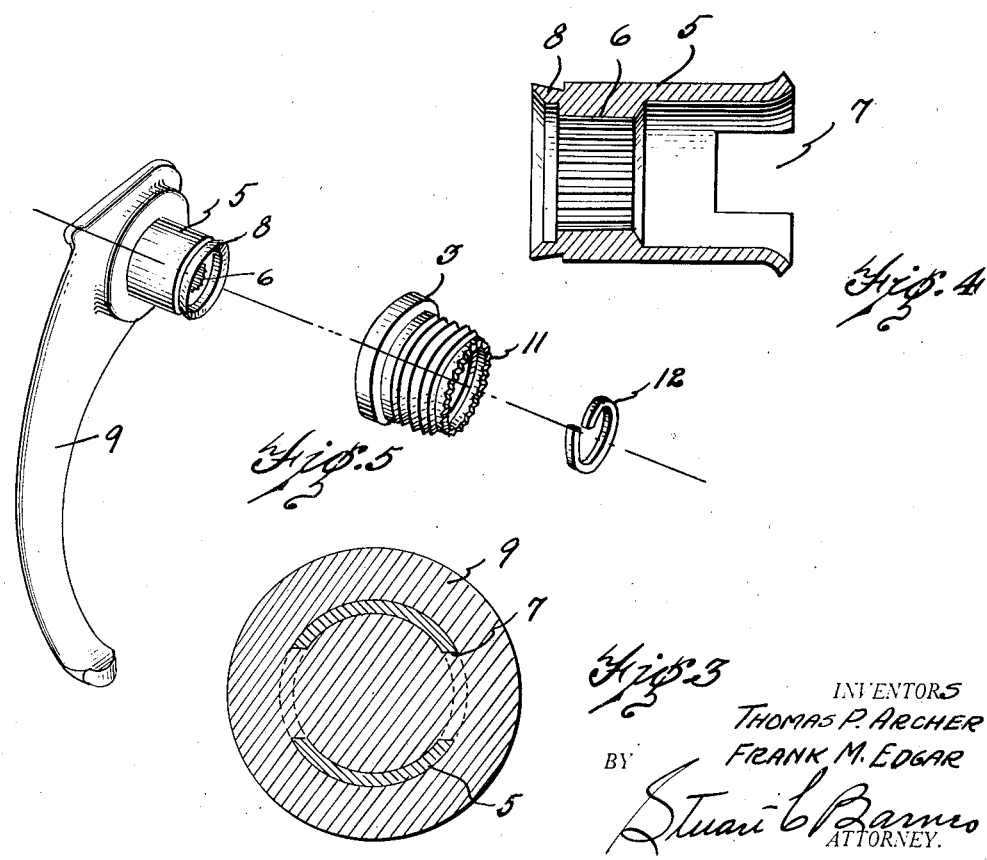
INVENTORS
THOMAS P. ARCHER
FRANK M. EDGAR
BY
Stuart C. Barnes
ATTORNEY.

Patented Mar. 26, 1929.

1,706,598

UNITED STATES PATENT OFFICE.

THOMAS P. ARCHER AND FRANK M. EDGAR, OF DETROIT, MICHIGAN, ASSIGNORS TO TERNSTEDT MANUFACTURING COMPANY, OF DETROIT, MICHIGAN, A CORPORATION OF MICHIGAN.

HANDLE ASSEMBLY.

Application filed January 11, 1926. Serial No. 80,446.

This invention relates to handle assemblies, and particularly to handle assemblies, including in combination a pull-to handle with novel assembly, and operating means.

It is the object of the present invention to combine a pull-to handle with novel latch operating means in such a manner as to provide an ornamental and compact assembly, and still result in an especially strong handle assembly by virtue of the inherent design and assembly of the parts.

A still further object of the invention is the provision of the handle and hub assembly, which is so designed and formed as to present a cast-united operating unit which is free from air holes and chill spots. Various other features of our invention will be apparent as this description progresses, and will be brought out in the claims appended hereto.

The preferred embodiment of our invention is shown in the accompanying drawings, wherein similar figures of reference designate corresponding parts, and wherein:

Fig. 1 is a fragmentary longitudinal section of our handle assembly, showing the pull-to handle assembly secured in place and adapted to receive the operating stud of the device to be actuated.

Fig. 2 is a horizontal cross section of the structure shown in Fig. 1, showing the handle assembly secured in place, and also showing a lock stud positioned within the handle assembly.

Fig. 3 is an enlarged cross sectional detail view taken on the line 3—3 of Fig. 1, showing the manner of casting the handle head around the hub.

Fig. 4 is an enlarged longitudinal sectional view of the handle hub or bushing shown in Fig. 1, and illustrating the preferred manner of forming slots in the walls of the hub.

Fig. 5 is a composite view in perspective of the various parts of our handle assembly and showing the manner in which they are assembled.

In the drawings, a typical lock case or window regulator casing is designated 1. This lock case may be secured to an automobile door or other element, and is provided with an adaptor bushing 2, which is preferably secured thereto by striking up a portion of the casing wall. This bushing 2 is internally threaded and adapted to receive a suitable nut or externally threaded sleeve 3.

This nut 3 forms the means for connecting our novel handle assembly to the casing of the device to be actuated. In order to actuate the lock or other means, we have shown, for the purposes of illustration, a square shank operating stud 4. The end of this stud, which projects into, or is received by the handle assembly, is provided with teeth or relatively fine serrations. This serrated stud is designed to complementally fit into the hub or bushing which forms an important part of our assembly, as will be presently described.

This hub or bushing may be designated 5, and as best shown in Fig. 4, is of general cylindrical shape and of hollow cross section. The forward end of this bushing is preferably broached as at 6 to form internal teeth or serrations on the walls of the bushing. The remainder of the interior wall of this bushing is preferably of greater diameter than the serrated part and is adapted to receive the metal forming the part of the handle which in the present case is designed to be cast-united thereto. One end of this bushing 5 is also provided with diametrically positioned key slots 7. The opposite end of this bushing is provided with a rim 8, which may be spun out as shown in Fig. 1 to rotatably retain the nut 3, in a well known manner. The slotted end of the bushing 5 is preferably outwardly flared to effect a secure anchorage of the same within the handle.

The handle, which in the present case, is a pull-to handle, is preferably a die casting, and is designated 9. In forming this handle, the bushing member 5, as shown in Fig. 4, is placed in the die of a die-casting machine. A suitable serrated core is placed within the serrated part of the bushing 5, and the serrations thereof preferably extend inwardly a short distance towards the key slots 7. The casting metal is then introduced into the die to form the handle, and when this metal enters that part of the die containing the bushing 5, the metal will flow into the interior of the bushing 5 very quickly, due to the large cross sectional entrance formed by the opening of the bushing and the two key slots 7. The purpose of the key slots is not only to securely anchor the bushing in the handle head, but to allow this metal to be admitted to the interior of the bushing very quickly to prevent chilling of the metal adjacent the core, and also to prevent the forming of air holes which would tend to be formed if the metal was merely introduced into the open end of an otherwise closed bushing. This metal flowing into the interior of the bushing will surround the projecting part of the core and thus the handle will be provided with an annular projection, the interior wall of which having serrations or teeth registering with the serrations or teeth in the bushing, as indicated at 10 in Fig. 1.

In assembling the various parts of this handle assembly, the nut 3 is placed on the hub or bushing 5, and the rim 8 of such hub is spun outwardly, as shown in Fig. 1, to rotatably position such nut upon the hub. One end of this nut 3 is provided with serrations 11, as best shown in Fig. 5. These serrations are adapted to engage with a split spring lock washer 12, which is designed to be placed within the adaptor bushing 2, and which bears against the up-turned wall of the lock case 1, and shown in Fig. 1.

Thus, in order to more rigidly secure the handle assembly on the lock case, the spring washer is placed within the adaptor bushing, and by screwing the nut 3 into such bushing the serrations 11 on one end of the nut 3 will contact with the split spring washer 12, and thus serve to lock the nut 3 and the handle assembly in place.

The serrated end of the stud 4, as shown in Fig. 2, may be designated 13, and when the handle assembly is screwed into place the serrations on such stud 4 not only contact with the teeth or serrations 6, forming a part of the bushing 5, but may also contact with the teeth or serrations formed in the part 10 on the handle. By this construction it will be obvious that the force required to turn the stud 4 is imparted to both the bushing 5 and the handle 9, and thus forms a means for preventing torsional strains between such bushing and handle, in addition to the locking arrangement formed by the key slots 7.

It will be noticed from an inspection of the drawings that the internal serrations formed in the bushing 5 and the external serrations 13 on the stud 4 are slightly tapered throughout their length. Such serrated portions of the bushing and stud are preferably tapered for the purpose of making these two parts draw up tightly together when the unit is assembled.

It will further be obvious that by providing a broached bushing and a complementary serrated stud member, it is possible to cast the handle onto the bushing 5 regardless of the position of the serrations or plurality of teeth when placed in the casting die. The cast handle and bushing may be directly secured to the adaptor bushing 2 to receive the serrated end of the operating stud, and the handle positioned vertically or in any other desired position, regardless of the rotative position of the operating stud.

Our novel arrangement of handle and bushing together with the serrated operating stud is also peculiarly and efficiently adapted for use with window regulators and windshield regulators for the reason that the handle may be readily secured to the serrated stub at any position. This completely does away with the unsightly, and sometimes inconvenient placing of the handle which has heretofore been necessary, where only four positions have been provided for the placing of the handle upon the operating stub, or spindle.

It will be understood that the nut 3 may be turned down to receive an escutcheon or rose plate 14 for ornamental purposes. It will be also understood that the contacting or operating surfaces between the bushing 5 and the stud 4 may be modified considerably without changing the scope of our invention.

Having thus described our invention, what we claim is:

1. In a handle assembly, the combination of a broached bushing for receiving a supporting nut and operating stud, and a handle cast onto one end of said bushing.

2. In a handle assembly, the combination of a bushing, serrations formed at one end of the interior walls of said bushing, key slots at the other end of said bushing, and a handle cast within and around one end of said bushing.

3. In a handle assembly, the combination of a bushing, a handle formed integral with said bushing, serrations on the interior wall of said bushing, and serrations on said handle registering with the serrations on said bushing.

4. In a handle assembly, the combination of a bushing, a handle formed integral with said bushing, serrations on the interior wall of said bushing, serrations on said handle registering with the serrations on said bushing, and an operating stud adapted to complementally engage the serrations on said bushing, said stud being of such length as to project beyond the serrations in the bushing whereby to complementally engage the serrations on the handle so that a turning force on the handle is communicated to the stud by both the handle and bushing.

5. In a handle assembly, the combination of a hub and a nut rotatably positioned on said hub, said nut being provided at its inner contacting end with a series of serrations, 6. In combination with a handle assembly, of means for receiving the handle assembly, a lock washer positioned within said receiving means, and means contacting with said washer and supported on said handle assembly for rotatably securing the handle assembly to said first named means.

7. In a handle assembly, the combination of a hub, a nut rotatably mounted on said hub, serrations on one face of said nut, means for receiving said nut, and a lock washer positioned within said receiving means and against which said serrations are adapted to contact.

8. In a handle assembly, the combination of a bushing provided at one end with internal serrations for receiving a serrated operating stud, a handle cast onto the other end of said bushing, a nut rotatably mounted on said bushing for securing the handle assembly in place, and serrations on one face of said nut for locking the handle assembly in position.

9. In a handle assembly, the combination of a bushing whose interior walls are provided with longitudinally tapered serrations, and a handle cast onto the end of said bushing.

10. In a handle assembly, the combination of a handle provided with tapered serrations and an operating stud provided with tapered serrations adapted to complementally engage the serrations on said handle.

11. In a handle assembly, the combination of a bushing whose interior walls are provided with serrations, and a handle of die casting metal cast onto on one end of said bushing, said metal partially filling the bushing and forming a closure wall at one end of a hollow bushing, said closure wall being spaced from the serrations in the bushing.

In testimony whereof we have affixed our signatures.

THOMAS P. ARCHER.
FRANK M. EDGAR.